United States Patent
Ma et al.

(10) Patent No.: US 9,927,615 B2
(45) Date of Patent: Mar. 27, 2018

(54) COMPACT AUGMENTED REALITY GLASSES WITH FOLDED IMAGING OPTICS

(71) Applicant: QUALCOMM Incorporated, San Diego, CA (US)

(72) Inventors: Jian Jim Ma, San Diego, CA (US); John Hyunchul Hong, San Clemente, CA (US); Tallis Young Chang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/219,034

(22) Filed: Jul. 25, 2016

(65) Prior Publication Data

US 2018/0024366 A1    Jan. 25, 2018

(51) Int. Cl.
*G02B 27/00*    (2006.01)
*G02B 27/01*    (2006.01)
*G02B 27/28*    (2006.01)

(52) U.S. Cl.
CPC ..... *G02B 27/0172* (2013.01); *G02B 27/0176* (2013.01); *G02B 27/283* (2013.01); *G02B 2027/014* (2013.01); *G02B 2027/015* (2013.01); *G02B 2027/0123* (2013.01); *G02B 2027/0132* (2013.01); *G02B 2027/0178* (2013.01)

(58) Field of Classification Search
CPC ........ G02B 27/0172; G02B 2027/0132; G02B 2027/0178; G02B 2027/014; G02B 2027/0123; G02B 27/283; G02B 27/0176; G02B 2027/015

See application file for complete search history.

(56) References Cited

U.S. PATENT DOCUMENTS

| | | | |
|---|---|---|---|
| 8,471,967 B2 | 6/2013 | Miao et al. | |
| 8,873,148 B1 | 10/2014 | Gupta et al. | |
| 2008/0106489 A1 | 5/2008 | Brown et al. | |
| 2012/0154920 A1 | 6/2012 | Harrison et al. | |
| 2014/0168035 A1 | 6/2014 | Luebke et al. | |
| 2015/0049390 A1 | 2/2015 | Lanman et al. | |
| 2015/0198805 A1 | 7/2015 | Mansharof et al. | |
| 2015/0219899 A1 | 8/2015 | Mack et al. | |

FOREIGN PATENT DOCUMENTS

WO    2014/154225    10/2014

*Primary Examiner* — Muhammad N Edun
(74) *Attorney, Agent, or Firm* — Weaver Austin Villeneuve & Sampson LLP (57) ABSTRACT

Some implementations of augmented reality glasses disclosed herein include an eyeglass substrate, two or more display elements, image optics configured for coupling light from the display elements into the eyeglass substrate and beam-splitting optics configured for directing light from the eyeglass substrate towards a viewer's eye and for allowing partial light from the real-world scene to arrive at a viewer's eye. The image optics may include one or more image optics lenses formed in the eyeglass substrate and may be positioned out of a line of sight of the viewer's eye when the viewer is wearing the augmented reality glasses. The image optics may be capable of coupling light from the display elements toward the beam-splitting optics along folded light paths caused by internal reflection within the eyeglass substrate.

23 Claims, 6 Drawing Sheets

COMPACT AUGMENTED REALITY GLASSES WITH FOLDED IMAGING OPTICS

TECHNICAL FIELD

This disclosure relates to optical devices and more particularly to augmented reality glasses.

DESCRIPTION OF THE RELATED TECHNOLOGY

Augmented reality glasses allow viewing of both a real-world scene and images generated by display elements. Some current augmented reality glasses are bulky, often due to bulky image optics. Another reason that some current augmented reality glasses are bulky is due to the distance between the image lens and the display elements, which is often approximately the focal length of the image lens. Improved augmented reality glasses would be desirable.

SUMMARY

The systems, methods and devices of this disclosure each have several innovative aspects, no single one of which is solely responsible for the desirable attributes disclosed herein.

Some innovative aspects of the subject matter described in this disclosure can be implemented in augmented reality glasses. In some implementations, the augmented reality glasses may include an eyeglass substrate, a display system, image optics and beam-splitting optics. In some examples, the display system may include two or more display elements.

The image optics may be configured for coupling light from the display elements into the eyeglass substrate. For example, the image optics may be configured to couple light from the display elements toward the beam-splitting optics along folded light paths caused by internal reflection within the eyeglass substrate. According to some implementations, the image optics may include one or more image optics lenses formed in the eyeglass substrate. In some implementations, the image optics may be configured to be positioned out of a line of sight of a viewer's eye when the augmented reality glasses are worn.

According to some examples, the beam-splitting optics may be configured for directing light from the eyeglass substrate towards the viewer's eye when the augmented reality glasses are worn. In some implementations, the beam-splitting optics may be configured for directing light from each display element towards the viewer's retina when the augmented reality glasses are worn. According to some such implementations, a virtual larger image may be formed via stitching together multiple smaller images, one from each display element. In some examples, the beam-splitting optics may be configured for directing a first image from a first display element to a first area of the viewer's retina and for directing a second image from a second display element to a second and adjacent area of the viewer's retina when the augmented reality glasses are worn. According to some implementations, the beam-splitting optics may be along the line of sight of the viewer's eye when the augmented reality glasses are worn.

According to some examples, the display elements may include one or more transparent liquid crystal displays, transmissive liquid crystal displays, organic light-emitting diode (OLED) displays or microelectromechanical displays. In some examples, the display elements may be attached to a first side of the eyeglass substrate and the image optics lens may be formed in a second and opposing side of the eyeglass substrate. According to some such examples, the image optics lens may be a half lens.

According to some implementations, the display elements may be attached to a first side of the eyeglass substrate and the image optics lens may be formed in the first side of the eyeglass substrate. Some such implementations also may include a mirror on a second and opposing side of the eyeglass substrate. The mirror may be configured to reflect light from a display element to the image optics lens.

According to some examples, the beam-splitting optics may include a polarizing beam-splitting layer. In some implementations, the polarizing beam-splitting layer may include one or more of a coating, a wire grid layer, or a film. In some such implementations, the polarizing beam-splitting layer may be on at least a portion of the eyeglass substrate. In some such implementations, the polarizing beam-splitting layer may allow approximately 50% of ambient light that has passed through the eyeglass substrate to pass through the beam-splitting optics. However, in other implementations the polarizing beam-splitting layer may allow more or less than 50% of the ambient light that has passed through the eyeglass substrate to pass through the beam-splitting optics. According to some examples, the polarizing beam-splitting layer may allow images of a real-world scene to pass through to the viewer's eye. In some such examples, the polarizing beam-splitting layer may allow images of the real-world scene to be superimposed on images from the display elements.

Alternatively, or additionally, in some implementations the beam-splitting optics may include a non-polarizing beam-splitting layer. The non-polarizing beam-splitting layer may, for example, include a coating, a film, or both a coating and a film.

In some implementations, the augmented reality glasses may include two lens portions. According to some such implementations, each of the lens portions may include: a portion of the eyeglass substrate; at least two of the display elements; an instance of the image optics; and an instance of the beam-splitting optics. In some such implementations, the augmented reality glasses also may include an eyeglass frame configured to position each of the lens portions proximate a corresponding viewer's eye when the augmented reality glasses are worn.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some augmented reality glasses can allow simultaneous viewing of a real-world scene and of images generated on a display element. As noted above, some currently-available augmented reality glasses tend to be bulky. Moreover, some types of augmented reality glasses do not provide a displayed image in the line of sight of the real-world scene and therefore cannot provide a true augmented reality experience for a user.

Various implementations of augmented reality glasses disclosed herein may include an eyeglass substrate, two or more display elements, image optics configured for coupling light from the display elements into the eyeglass substrate and beam-splitting optics configured for directing light from the eyeglass substrate towards a viewer's eye. The image optics may include one or more image optics lenses formed in the eyeglass substrate and may be positioned out of a line of sight of the viewer's eye when the viewer is wearing the augmented reality glasses. The image optics may be capable of coupling light from the display elements toward the beam-splitting optics along folded light paths caused by internal reflection within the eyeglass substrate. In some examples, the beam-splitting optics may be configured for directing light from each display element towards the viewer's retina when the viewer is wearing the augmented reality glasses, such that a virtual larger image is formed via stitching together multiple smaller images, one from each display element.

Particular implementations of the subject matter described in this disclosure can be implemented to realize one or more of the following potential advantages. Some implementations of augmented reality glasses disclosed herein may allow a relatively more compact form factor, as compared to previously-available devices. Some such implementations may include relatively smaller display elements, but may still provide a virtual image of substantial size by stitching together multiple smaller images, one from each display element. In some examples, the image optics can be formed in a single substrate and can be fabricated via a low-cost process, such as a molding process. In some examples, the image optics may be configured to form a virtual image at a distance for the viewer's eyes to see comfortably when the viewer's eyes are relaxed.

Figure 1:
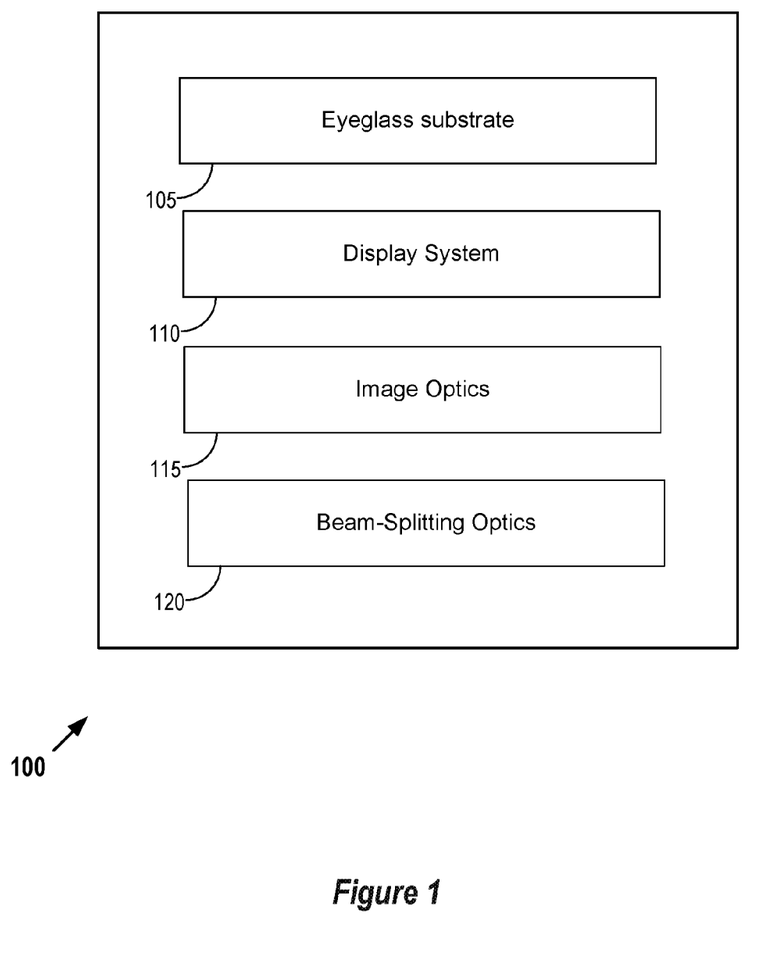
FIG. 1 is a block diagram that shows examples of elements for augmented reality glasses.

FIG. 1 is a block diagram that shows examples of elements for augmented reality glasses. The elements of FIG. 1 are merely provided by way of example. Some implementations of augmented reality glasses may include more or fewer elements. In this example, the augmented reality glasses 100 include an eyeglass substrate 105, a display system 110, image optics 115 and beam-splitting optics 120.

The eyeglass substrate 105 may include one or more transparent, or substantially transparent, materials such as glass, plastic, etc. In some examples, the eyeglass substrate 105 may include a borosilicate glass, a soda lime glass, quartz, Pyrex, or other suitable glass material. In some implementations, the eyeglass substrate 105 may include polycarbonate and/or polyurethane or other suitable polymer material. The eyeglass substrate 105 may, in some examples, include two lens portions. Some examples are described below. In some alternative implementations the eyeglass substrate 105 may have a single lens portion, which may be formed into goggles or into a monocle.

In some implementations, the display system 110 may include two or more display elements. The display elements may be located in or on various parts of the eyeglass substrate 105, depending on the particular implementation. In some implementations, one or more of the display elements may be transparent liquid crystal display elements. According to some examples, the display system 110 may include at least one interferometric modulator display element, light-emitting diode display, organic light-emitting diode display element, or other type of display element. The display system 110 may include a control system and a power system. The power system may, for example, include one or more batteries. The control system may, for example, include a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof.

According to some examples, the image optics 115 may include one or more image optics lenses formed into the eyeglass substrate 105. In some examples, the image optics 115 may include one or more mirrors formed in or on the eyeglass substrate 105. The image optics 115 may be configured for coupling light from the display elements into the eyeglass substrate 105. In some implementations, the image optics may be positioned out of a line of sight of a viewer's eye when the augmented reality glasses 100 are worn. According to some implementations, the image optics 115 may be configured to couple light from the display elements toward the beam-splitting optics 120 along folded light paths caused by total internal reflection within the eyeglass substrate 105.

Accordingly, in some implementations, the eyeglass substrate 105 may be capable of functioning as a light guide. In some such examples, the eyeglass substrate 105 may include an internal core layer and external cladding layers. The cladding layers may have a lower refractive index than that of the core layer.

According to some examples, at least one of the display elements may be attached to a first side of the eyeglass substrate 105 and one or more image optics lenses may be formed in a second and opposing side of the eyeglass substrate 105. Alternatively, or additionally, at least one of the display elements may be attached to a first side of the eyeglass substrate 105 and the image optics lens is formed in the first side of the eyeglass substrate 105. In some implementations, at least one image optics lens may be a half lens. Some examples are described below.

The beam-splitting optics 120 may, in some examples, be configured for directing light from the eyeglass substrate 105 towards a viewer's eye when the augmented reality glasses 100 are worn. In some implementations, the beam-splitting optics 120 may be configured for directing light from each display element towards the viewer's retina when the augmented reality glasses 100 are worn. In some such implementations, a larger image (which may be referred to herein as a "virtual larger image") may be formed via stitching together multiple smaller images, one from each display element.

According to some examples, the beam-splitting optics 120 may be configured for directing a first image from a first display element to a first area of the viewer's retina and for directing a second image from a second display element to a second and adjacent area of the viewer's retina when the augmented reality glasses are worn. In some implementations, the beam-splitting optics 120 may be along the line of sight of the viewer's eye when the augmented reality glasses 100 are worn. The beam-splitting optics 120 also allows the viewer to see the real-world scene.

Figure 2:
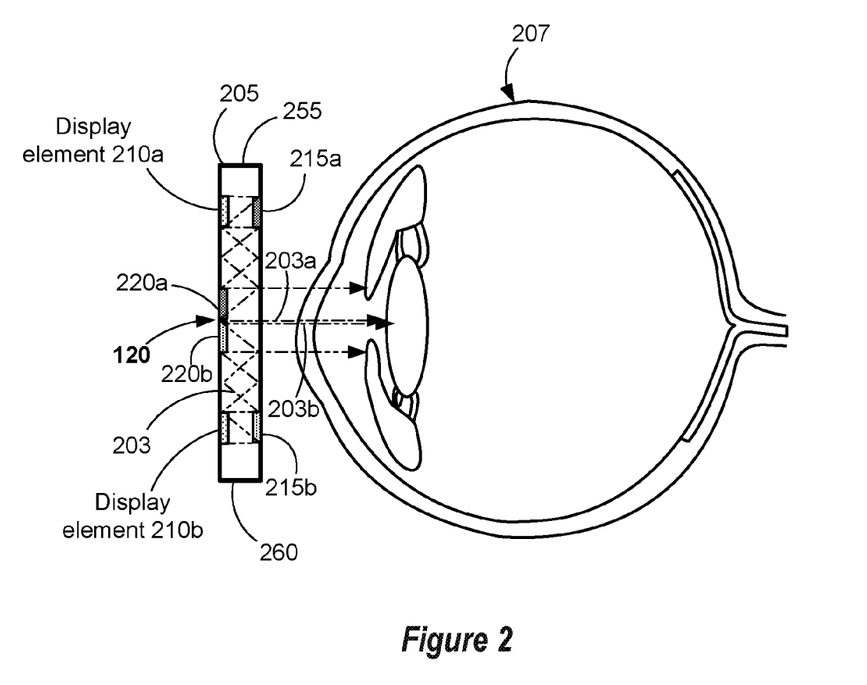
FIG. 2 shows example cross-sections of a lens portion of augmented reality glasses and of a viewer's eye.

FIG. 2 shows example cross-sections of a lens portion of augmented reality glasses and of a viewer's eye. The types, numbers and arrangement of elements shown in FIG. 2, and shown in other figures disclosed herein, are merely examples. Here, FIG. 2 provides a top view of the lens portion 205 and the viewer's eye 207. In this example, the lens portion 205 includes an instance of the above-described eyeglass substrate 105. The display elements 210a and 210b shown in FIG. 2 are example components of the above-described display system 110. In some examples, the display elements 210a and 210b may be transparent liquid crystal display elements. Alternative examples may include different numbers or types of display elements. In some alternative examples, one or more of display elements may be disclosed in a different location, such as at the end portion 255 or the end portion 260.

In this example, the image optics elements, including image optics elements 215a and 215b, are configured to couple light 203 that is emitted by the display elements 210a and 210b into the eyeglass substrate. In this implementation, the image optics elements are configured to couple the light 203 toward the beam-splitting optics along folded light paths caused by total internal reflection within the eyeglass substrate. The image optics elements 215a and 215b may, for example, include lenses, mirrors, holographic elements, etc., that are configured for light turning and imaging functionalities, including coupling the light 203 into the eyeglass substrate. In this example, the display elements 210a and 210b are attached to, or formed in, a first side of the eyeglass substrate and image optics elements 215a and 215b are attached to, or formed in, a second and opposing side of the eyeglass substrate. In this implementation, the image optics elements 215a and 215b are positioned out of a line of sight of a viewer's eye when the augmented reality glasses are worn.

Here, the beam-splitting optics 120 are configured for directing light 203 from the eyeglass substrate towards the viewer's eye 207 when the lens portion 205 is properly positioned, e.g., when augmented reality glasses that include the lens portion 205 are worn. In this example, the beam-splitting optics 120 includes beam-splitting optics elements 220a and 220b. Here, the beam-splitting optics elements 220a and 220b are shown directing light rays 203a and 203b from the eyeglass substrate towards the viewer's eye 207, along lines of sight of the viewer's eye 207.

Figure 3:
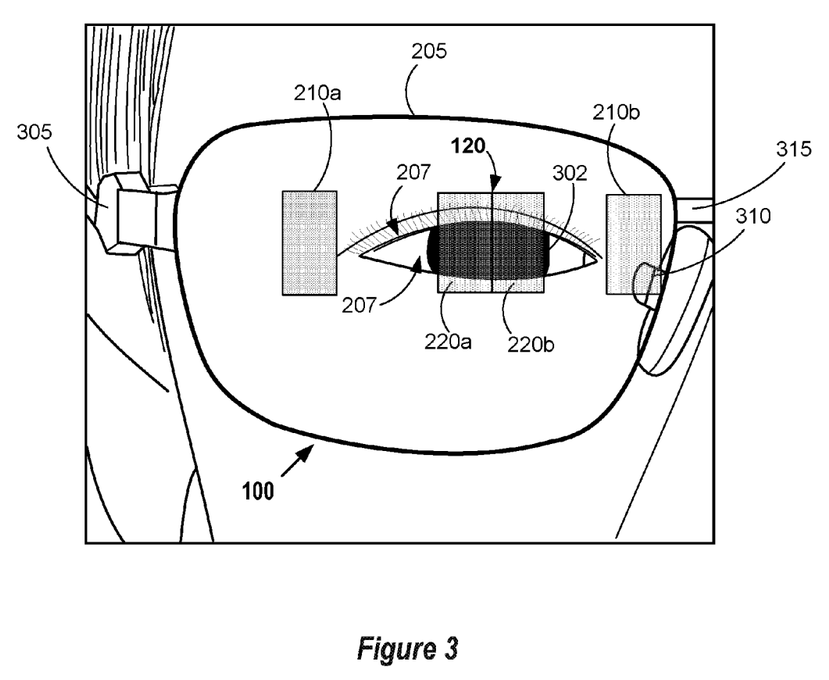
FIG. 3 shows a front view of a lens portion of augmented reality glasses according to one example.

FIG. 3 shows a front view of a lens portion of augmented reality glasses according to one example. The types, numbers and arrangement of elements shown in FIG. 3 are merely made by way of example. In this implementation, the lens portion 205 includes some elements that are comparable to those shown FIG. 2, including the display elements 210a and 210b, and the beam-splitting optics elements 220a and 220b. As with the example shown in FIG. 2, in this implementation the image optics elements (not shown) are positioned out of a line of sight of the viewer's eye 207 when the augmented reality glasses 100 are worn.

However, additional example elements of the augmented reality glasses 100 are shown in FIG. 3. Here, the augmented reality glasses 100 include eyeglass frame elements that include a temple 305 for securing the lens portion 205 to a side of the viewer's head, as well as a nose piece 310 for supporting the lens portion 205 on the viewer's nose. In this example, the eyeglass frame elements include a bridge 315 that is configured to connect the lens portion 205 to another lens portion 205, which is not shown in FIG. 3. These eyeglass frame elements are example constituents of an eyeglass frame that is configured to position each of the lens portions 205 proximate a viewer's eye when the augmented reality glasses are worn.

Accordingly, in this example the augmented reality glasses 100 include two lens portions 205. In this implementation, each of the lens portions 205 includes a portion of the eyeglass substrate 105, at least two display elements of the display system 110 and an instance of the beam-splitting optics 120. In this implementation, each of the lens portions 205 also includes at least one image optics element, which may be similar to the image optics elements 215a and 215b shown in FIG. 2. In some examples, each of the lens portions 205 may have a thickness that is comparable to that of an ordinary pair of eyeglass lenses. In some such examples, each of the lens portions 205 may have a thickness that is less than 5 mm, e.g., between 2 mm and 5 mm.

The iris 302 of the viewer's eye 207 may clearly be seen through the beam-splitting optics elements 220a and 220b in this example. This is meant to indicate that in this example at least some ambient light can pass through the eyeglass substrate and the beam-splitting optics 120 to the viewer's eye 207. Accordingly, images of a real-world scene can be superimposed on images from the display elements, allowing the viewer's eye 207 to simultaneously perceive both the images from the display elements and images of a real-world scene. In some implementations, approximately half of the light from the display elements 210a and 210b can pass through the beam-splitting optics 120 and approximately half of the ambient light can pass through the eyeglass substrate and the beam-splitting optics 120 to the viewer's eye 207. However, the reflectivity of the beam-splitting optics 120 may vary according to the particular implementation.

Figure 4:
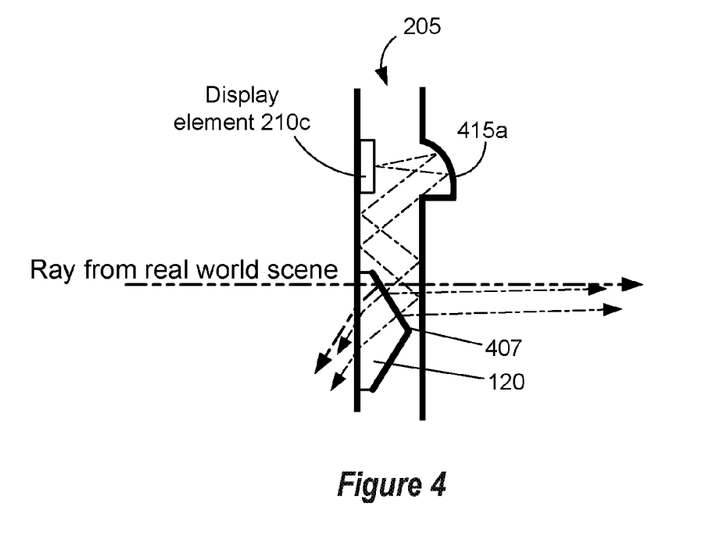
FIGS. 4 and 5 shows alternative examples of image optics.
Figure 5:
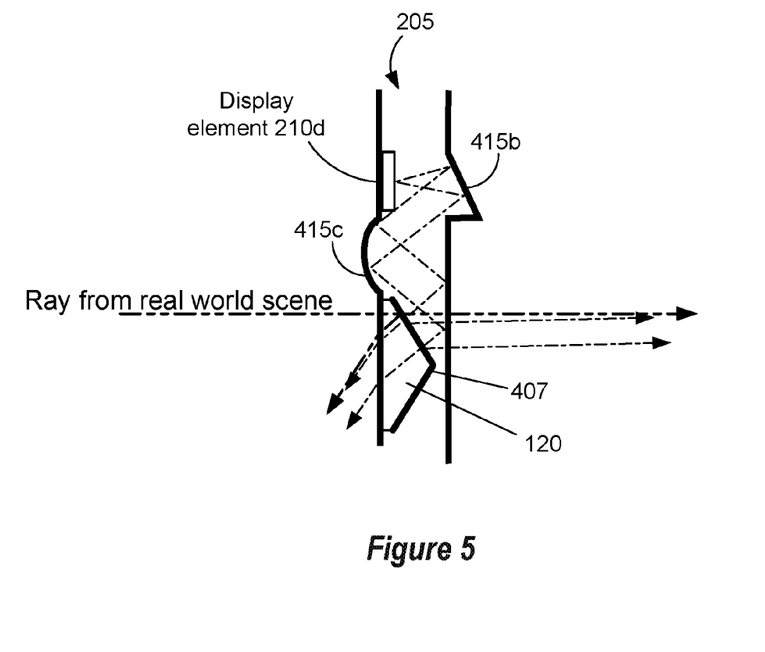

In some examples, the beam-splitting optics 120 may include a reflective polarizing beam-splitting layer to transmit p-polarized light while reflecting s-polarized light. The polarizing beam-splitting layer may include a wire grid polarizing beam-splitter, a multi-layer dielectric coating polarizing beam-splitter, or another types of polarizing beam-splitter. Some examples are shown in FIGS. 4 and 5. The reflective polarizing beam-splitting layer may include a coating, a film, or a wire grid layer. In some such examples, the polarizing beam-splitting layer may allow images of a real-world scene to pass through to the viewer's eye. According to some implementations, the transmission of polarizing beam-splitters to the un-polarized ambient light is about 50%. Moreover, the polarizing beam-splitting layer may allow images of the real-world scene to be superimposed on images from the display elements 210a and 210b. The reflectivity of the polarizing beam-splitters to the s-polarized light from the display elements may, in some examples, be close to 100%.

In some examples, the beam-splitting optics 120 may include a non-polarizing beam-splitting layer. The non-polarizing beam-splitting layer may include a coating or a film. According to some examples, the reflectivity of the reflective non-polarizing beam-splitting layer may be selected to control how much ambient light can pass through the eyeglass substrate and the beam-splitting optics 120 to the viewer's eye 207. In some examples, the non-polarizing beam-splitting layer may have a reflectivity of approximately 50%. In alternative implementations, the non-polarizing beam-splitting layer may have a reflectivity of approximately 20%, approximately 25%, approximately 30%, approximately 35%, approximately 40%, approximately 45%, approximately 55%, approximately 60%, approximately 65%, approximately 70%, approximately 75%, approximately 80%, etc. In some such examples, the non-polarizing beam-splitting layer may allow images of a real-world scene to pass through to the viewer's eye. Moreover, the non-polarizing beam-splitting layer may allow images of the real-world scene to be superimposed on images from the display elements 210a and 210b.

According to some examples, beam-splitting layer (whether polarizing or -non-polarizing) is on at least a portion of the eyeglass substrate 105. In the example shown in FIG. 3, the outlines of the beam-splitting optics elements 220a and 220b may clearly be seen. However, in some alternative examples wherein a beam-splitting layer is on at least a portion of the eyeglass substrate 105, the outlines of the beam-splitting optics elements 220a and 220b may not be seen as clearly, or may not be visible under ordinary lighting conditions. In some implementations, a beam-splitting layer may be disposed on portions of the eyeglass substrate 105 in which the beam-splitting optics 120 and the display elements 210a and 210b are located.

FIGS. 4 and 5 shows alternative examples of image optics. In the example shown in FIG. 4, the lens portion 205 includes an image optics element 415a and a display element 210. In this example, the image optics element 415a is a half lens. In some implementation, the image optics 415a is a full lens. In some implementations, the lens portion 205 may include another image optics element and another display element.

In the example shown in FIG. 5, the lens portion 205 includes a display element 210d and image optics elements 415b and 415c. In this example, the image optics element 415b is a mirror and the image optics element 415c is an image optics lens. The image optics elements 415b and 415c, and the beam-splitting optics 120, may be configured for directing light from the display element 210d and one or more other display elements towards a viewer's retina when the augmented reality glasses are worn, such that a virtual larger image is formed via stitching together multiple smaller images, one from each display element.

In the implementations shown in FIGS. 4 and 5, the index of refraction of the beam-splitting optics 120 matches, or at least nearly matches, the index of refraction of the eyeglass substrate of the lens portion 205. Accordingly, this implementation can prevent distortions that would otherwise be caused by refracting light due to a difference between the index of refraction of the beam-splitting optics 120 and the index of refraction of the eyeglass substrate.

In the examples shown in FIGS. 4 and 5, the beam-splitting optics 120 has a beam-splitting layer 407 formed thereon. The beam-splitting layer 407 may have properties such as described above. In some examples, the beam-splitting layer 407 may include a non-polarizing beam-splitter that reflects approximately half of the incident light. Referring to FIG. 4, in some examples the beam-splitting layer 407 is a polarizing beam-splitter and causes approximately 100% of the s-polarized light from the display element 210c that is reflected from the image optics element 415a to pass through the beam-splitting optics 120 and approximately 100% of the light to be reflected towards a viewer's eye. Likewise, the polarizing beam-splitting layer 407 allows approximately half of the un-polarized ambient light from a real-world scene to pass through the beam-splitting optics 120 towards a viewer's eye. In other implementations, the beam-splitting layer 407 is a non-polarizing beam-splitter and may reflect more than half of the incident light or less than half of the incident light, e.g., as described above.

Figure 6:
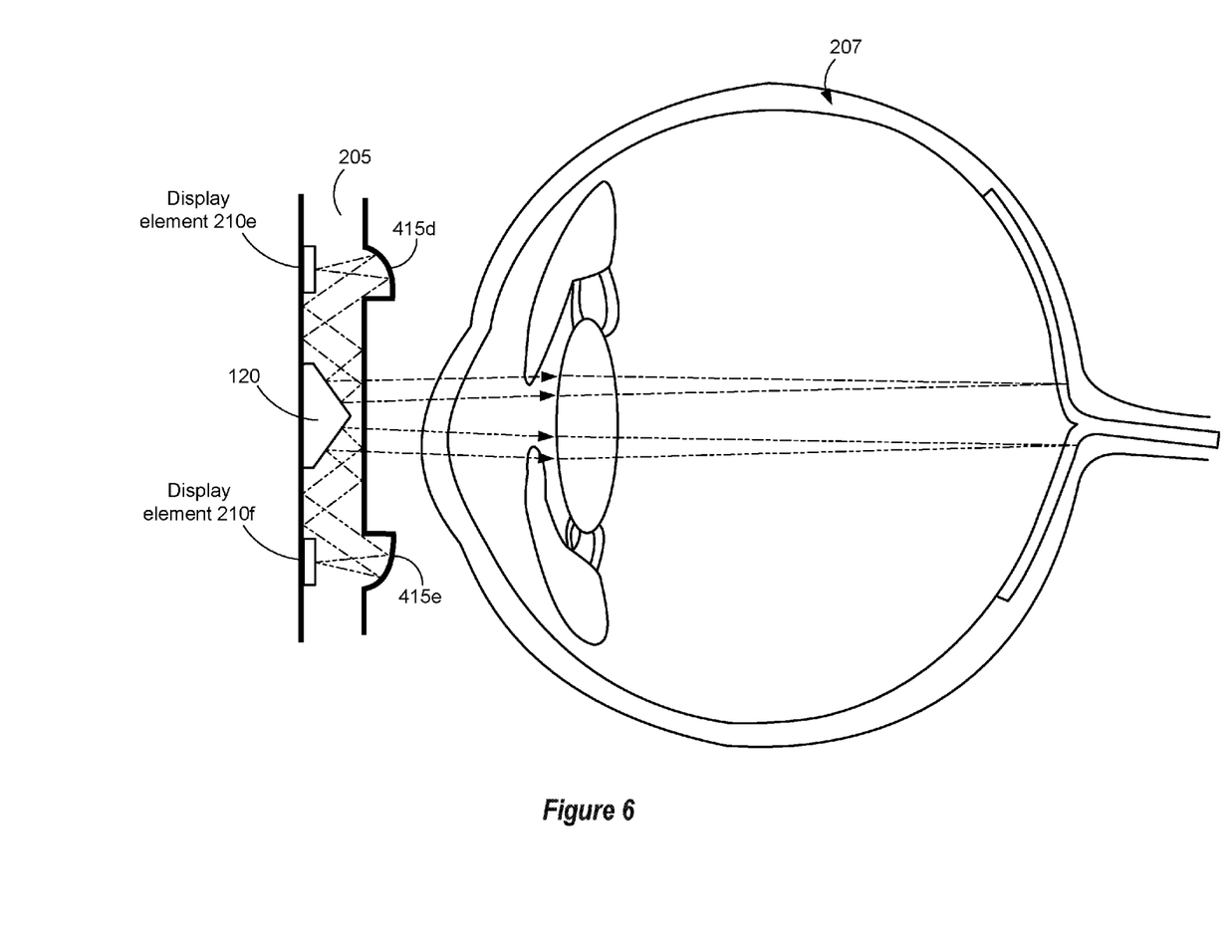
FIG. 6 shows an example of a lens portion like that shown in FIG. 4 directing light into a viewer's eye.

FIG. 6 shows an example of a lens portion like that shown in FIG. 4 directing light into a viewer's eye. In this example, the lens portion 205 includes image optics elements 415d and 415e, and display elements 210e and 210f. In this example, the image optics elements 415d and 415e are half lenses. In this example, the image optics elements 415d and 415e, and the beam-splitting optics 120, are configured for directing light from the 415d and 415e towards a retina of the viewer's eye 207 when the augmented reality glasses are worn, such that a virtual larger image is formed via stitching together multiple smaller images, one from each display element. In some implementations, the image optics elements 415d and 415e are full lenses.

Figure 7:
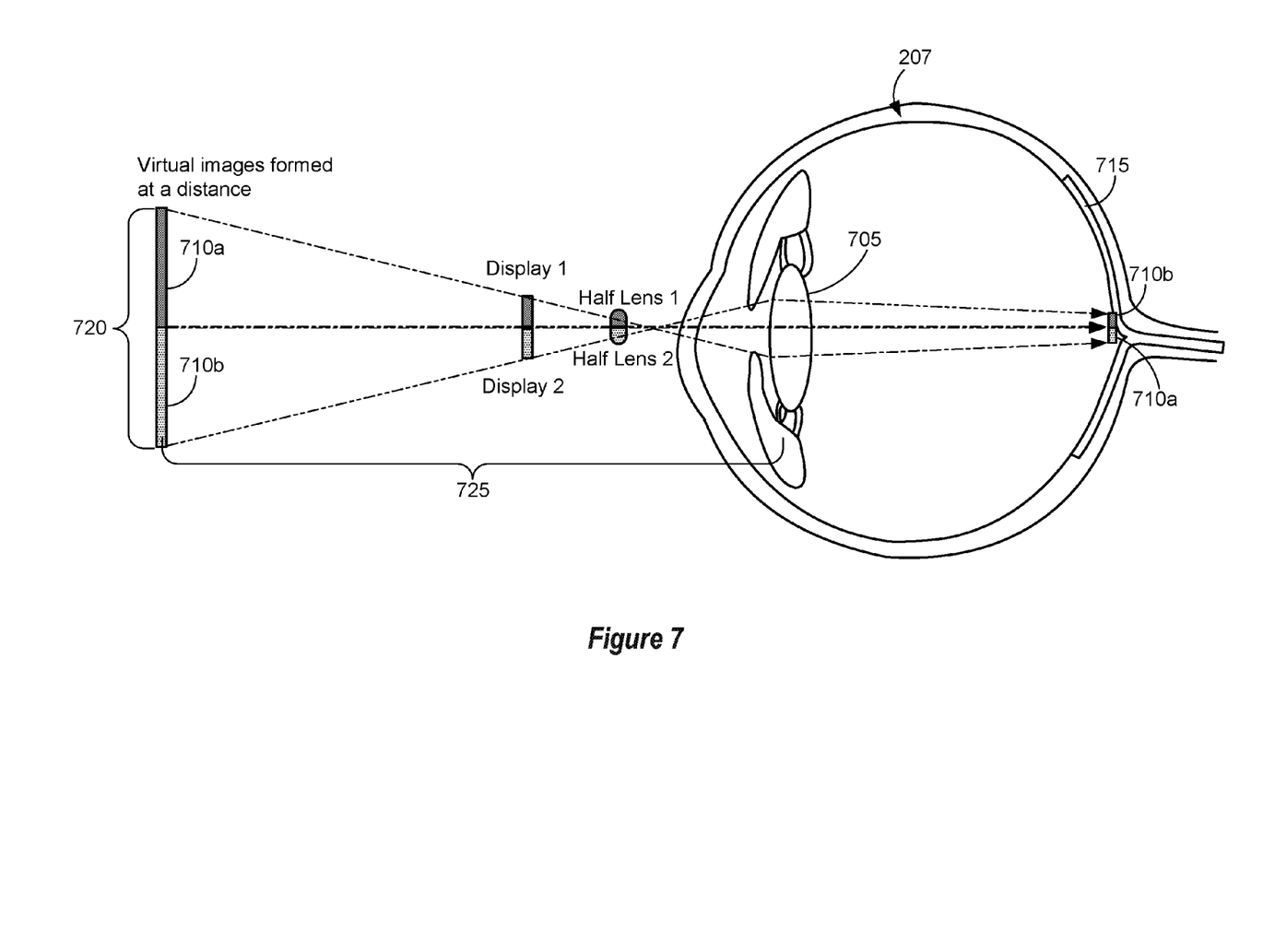
FIG. 7 shows an example of forming a virtual larger image via stitching together multiple smaller images, one from each of two display elements.

FIG. 7 shows an example of forming a virtual larger image via stitching together multiple smaller images, one from each of two display elements. The example shown in FIG. 7 is applicable to implementations such as the example shown in FIG. 6. The Display 1 and Display 2 shown in FIG. 7 may, in some examples, correspond to the display elements 210e and 210f shown in FIG. 6. Likewise, the Half Lens 1 and Half Lens 2 shown in FIG. 7 may, in some instances, correspond to the image optics elements 415d and 415e shown in FIG. 6.

However, the arrangement of elements in FIG. 7 makes it easier to understand this example of image stitching, primarily because of the simplified ray paths shown in FIG. 7. In this example, light from Display 1 passes through Half Lens 1 and is refracted by the lens 705 within the viewer's eye 207, causing a first image 710a to be formed in a first area of the viewer's retina 715. Similarly, light from Display 2 passes through Half Lens 2 and is refracted by the lens 705, causing a second image 710b to be formed in a second and adjacent area of the viewer's retina 715.

The viewer perceives the first image 710a and the second image 710b as a single virtual larger image 720, at a perceived distance 725. The perceived distance and size of the virtual image 720 can be controlled by the focal length of the image lenses, for example, Half Lens 1 and Half Lens 2, and the distances between the displays and the image lenses. According to some implementations, the focal length of the image lenses and the distances between the displays and the image lenses are selected to produce a virtual larger image 720 at a perceived distance that is between one foot and ten feet from the eyeglass substrate.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. Augmented reality glasses, comprising:
    an eyeglass substrate;
    a display system that includes two or more display elements;
    image optics configured for coupling light from the display elements into the eyeglass substrate, the image optics including one or more image optics lenses formed in the eyeglass substrate, the image optics configured to be positioned out of a line of sight of a viewer's eye, wherein the display elements are attached to a first side of the eyeglass substrate and wherein at least one of the one or more image optics lenses is formed in a second and opposing side of the eyeglass substrate; and
    beam-splitting optics configured for directing light from the eyeglass substrate towards the viewer's eye, wherein the image optics are configured to couple light from the display elements toward the beam-splitting optics along folded light paths caused by internal reflection within the eyeglass substrate.

2. The augmented reality glasses of claim 1, wherein the beam-splitting optics are configured for directing light from each display element towards the viewer's retina, such that a virtual larger image is formed via stitching together multiple smaller images, one from each display element.

3. The augmented reality glasses of claim 1, wherein the beam-splitting optics are configured for directing a first image from a first display to a first area of the viewer's retina and for directing a second image from a second display to a second and adjacent area of the viewer's retina.

4. The augmented reality glasses of claim 1, wherein the beam-splitting optics are along the line of sight of the viewer's eye.

5. The augmented reality glasses of claim 1, wherein the at least one of the one or more image optics lenses is a half lens.

6. The augmented reality glasses of claim 1, wherein the display elements are attached to a first side of the eyeglass substrate and wherein at least one of the one or more image optics lenses is formed in the first side of the eyeglass substrate.

7. The augmented reality glasses of claim 6, further comprising a mirror on a second and opposing side of the eyeglass substrate, the mirror configured to reflect light from a display element to at least one of the one or more image optics lenses.

8. The augmented reality glasses of claim 1, wherein the beam-splitting optics includes a polarizing beam-splitting layer.

9. The augmented reality glasses of claim 8, wherein the polarizing beam-splitting layer includes one or more of a coating, a wire grid layer, or a film.

10. The augmented reality glasses of claim 8, wherein the polarizing beam-splitting layer allows approximately 50% of ambient light that has passed through the eyeglass substrate to pass through the beam-splitting optics.

11. The augmented reality glasses of claim 8, wherein the polarizing beam-splitting layer allows images of a real-world scene to pass through to the viewer's eye.

12. The augmented reality glasses of claim 11, wherein the polarizing beam-splitting layer allows images of the real-world scene to be superimposed on images from the display elements.

13. The augmented reality glasses of claim 8, wherein the polarizing beam-splitting layer is on at least a portion of the eyeglass substrate.

14. The augmented reality glasses of claim 1, wherein the beam-splitting optics includes a non-polarizing beam-splitting layer.

15. The augmented reality glasses of claim 14, wherein the non-polarizing beam-splitting layer includes a coating, a film, or both a coating and a film.

16. The augmented reality glasses of claim 1, wherein the display elements include one or more transparent liquid crystal displays, transmissive liquid crystal displays, organic light-emitting diode (OLED) displays or microelectromechanical displays.

17. The augmented reality glasses of claim 1, further comprising two lens portions, each of the lens portions including:
    a portion of the eyeglass substrate;
    at least two of the display elements;
    an instance of the image optics; and
    an instance of the beam-splitting optics.

18. The augmented reality glasses of claim 17, further comprising an eyeglass frame configured to position each of the lens portions proximate a corresponding viewer's eye.

19. Augmented reality glasses, comprising:
    an eyeglass substrate;
    a display system that includes two or more display elements;
    image optics means for coupling light from the display elements into the eyeglass substrate, the image optics means forming a virtual image at a perceived distance between one foot and ten feet from the eyeglass substrate, the image optics means including one or more structures formed in the eyeglass substrate, the image optics means configured to be positioned out of a line of sight of a viewer's eye; and
    beam-splitting means for directing light from the eyeglass substrate towards the viewer's eye, wherein the image optics means includes means for coupling light from the display elements toward the beam-splitting means along folded light paths caused by internal reflection within the eyeglass substrate.

20. The augmented reality glasses of claim 19, wherein the beam-splitting means includes means for directing light from each display element towards the viewer's retina, such that a virtual larger image is formed via stitching together multiple smaller images, one from each display element.

21. The augmented reality glasses of claim 19, wherein the beam-splitting means includes means for directing a first image from a first display element to a first area of the viewer's retina and for directing a second image from a second display element to a second and adjacent area of the viewer's retina.

22. The augmented reality glasses of claim 19, wherein the beam-splitting means includes means for allowing partial light from a real-world scene to arrive at a viewer's eye.

23. Augmented reality glasses, comprising:
- an eyeglass substrate;
- a display system that includes two or more display elements;
- image optics configured for coupling light from the display elements into the eyeglass substrate, the image optics including one or more image optics lenses formed in the eyeglass substrate, the image optics configured to be positioned out of a line of sight of a viewer's eye; and
- beam-splitting optics configured for directing light from the eyeglass substrate towards the viewer's eye, wherein the image optics are configured to couple light from the display elements toward the beam-splitting optics along folded light paths caused by internal reflection within the eyeglass substrate and wherein the beam-splitting optics are configured for directing a first image from a first display to a first area of the viewer's retina and for directing a second image from a second display to a second and adjacent area of the viewer's retina.

* * * * *